United States Patent [19]
Sherwood et al.

[11] Patent Number: 4,618,111
[45] Date of Patent: Oct. 21, 1986

[54] SPACECRAFT STRUCTURE FOR SUPPORTING AN OPTICAL BENCH

[75] Inventors: Duane D. Sherwood; John J. Conway, both of Torrance, Calif.

[73] Assignee: TRW Inc., Redondo Beach, Calif.

[21] Appl. No.: 608,331

[22] Filed: May 8, 1984

[51] Int. Cl.⁴ .............................................. B64G 1/22
[52] U.S. Cl. ................................ 244/158 R; 248/176; 248/DIG. 1
[58] Field of Search ............... 244/158 R, 160, 161, 244/118.1; 248/133, 139, 659, 671, 176, 177, DIG. 1; 350/253, 609, 537; 33/299, DIG. 19; 410/47, 49, 2

[56] References Cited

U.S. PATENT DOCUMENTS 3,815,849  6/1974  Meston ............................ 244/160
4,082,240  4/1978  Heathman et al. .............. 244/161
4,377,933  3/1983  Lojou ............................... 248/133

Primary Examiner—Galen L. Barefoot
Assistant Examiner—R. Corl
Attorney, Agent, or Firm—Noel F. Heal

[57] ABSTRACT

A mounting structure for securing a payload such as a telescope or other sensitive optical bench, to a spacecraft, in such a manner that accleration loads are transferred to the telescope in a normal manner, but deformations in the spacecraft are isolated from the telescope. The mounting structure includes two trunnion supports and two keel supports, arranged to isolate the telescope from deformations caused by thermal gradients or other phenomena.

18 Claims, 10 Drawing Figures

4,618,111

SPACECRAFT STRUCTURE FOR SUPPORTING AN OPTICAL BENCH

BACKGROUND OF THE INVENTION

This invention relates generally to supporting structures for use in spacecraft, and more particularly, to structures suitable for supporting space-based telescopes or optical benches. Space telescopes and other spacecraft payloads containing an optical bench are extremely sensitive to structural distortions. Distortions may be due to inertial forces caused by acceleration of the spacecraft, or by thermal effects when the spacecraft is exposed to radiation from the sun or other sources.

A space telescope must normally be supported as a payload on a spacecraft structure. The spacecraft and telescope combination must also include commmunications systems, power systems, possibly a propulsion system, and various other systems needed to support the spacecraft and telescope in a desired operational orbit. The spacecraft is typically placed in its operational orbit by first being launched from earth in a space shuttle vehicle or an expendable launch vehicle, which lifts its cargo to a relatively low-altitude parking orbit. If the desired operational orbit is of greater altitude than the parking orbit, the spacecraft is propelled to its operational orbit by an on-board propulsion system or by means of a separate propulsion stage.

There are two seemingly incompatible requirements for a mounting structure linking the telescope to the spacecraft. First, structural deformations of the spacecraft should ideally not be transmitted to the telescope. these deformations may be caused by thermal gradients, elastic or plastic deformation of the spacecraft during launch or assembly, or by other sources. The second requirement is that the mounting structure must provide sufficient strength and rigidity to transmit launch loads from the telescope to the launch vehicle, and also provide sufficient rigidity to permit precision pointing of the telescope by the spacecraft. An associated requirement is that the supporting structure be compatible with suitable launch vehicles, such as the shuttle orbiter and expendable launch vehicles, as well as with integral propulsion systems or other propulsive stages.

Although it is a relatively simple matter to provide a mounting structure that rigidly connects a telescope to a spacecraft, such a rigid interface would also transmit spacecraft deformations to the telescope. In a kinematic mounting structure, a mounted body is constrained from movement in only six degrees of freedom, namely movement along each of the three spatial axes, and rotation about the three axes. If a supported body is constrained in more than six degrees of freedom with respect to a mounting structure, it is said to be over-constrained. In an over-constrained mounting, some distortions of the mounting structure are transmitted to the supported body.

Prior space telescope support structures have not successfully addressed these difficulties. The National Aeronautics and Space Administration (NASA) Space Telescope project employs a design in which a telescope is supported by a collar-like spacecraft structure, contacting the telescope in substantially a single plane. The telescope is basically cantilevered out from this support structure, and is therefore free of any transmitted distortions that might have been present if both ends of the telescope had been secured to the spacecraft.

However, there are a number of disadvantages to the NASA Space Telescope approach. First, it is effective only if the greater part of the mass of the telescope is concentrated near the plane of support. Any other mass distribution will give rise to significant support problems both during launch and in maneuvering the telescope in space. Even if the mass is concentrated near the support plane, re-orienting the telescope, or performing other orbital maneuvers, can stress and distort the cantilevered telescope. Furthermore, the collar-like spacecraft structure is inconvenient, and therefore costly, to assemble about the telescope. The resulting telescope-spacecraft structure is, in a sense, an integrated or unitary one, although there may be a kinematic mounting interface between them. In fact, some of the support subsystems are disposed on the telescope rather than on the spacecraft itself.

A more recent NASA project, the proposed Gamma Ray Observatory (GRO), does not use the cantilevered approach of the Space Telescope, but instead employs an over-constrained mounting to secure an instrument payload to a spacecraft. However, the GRO has a much less stringent need for pointing accuracy than the Space Telescope, and distortions of the instruments are therefore of less significance.

It will be appreciated from the foregoing that there is a need for a spacecraft mounting structure that addresses these problems and provides an ideal support for a space telescope or optical bench. The mounting structure must not be over-constrained, should constrain movement in six degrees of freedom, and should isolate the telescope from distortions of the spacecraft. The present invention is directed to this end.

SUMMARY OF THE INVENTION

The present invention resides in a spacecraft mounting structure for use in supporting a telescope or the like, the structure providing appropriate transmission of acceleration forces associated with launching or maneuvering, yet providing decoupling of deformation forces. Briefly, and in general terms, the structure of the invention comprises a pair of trunnion supports, and first and second keel supports. The trunnion supports each provide reaction to loads in two orthogonal directions, but not in a direction parallel to the transverse direction between the two supports. The first keel support, which is preferably located between the trunnion supports, provides reaction only to loads in the transverse direction, and the second keel support is spaced longitudinally from the first, and provides reaction to loads only in a direction orthogonal to the transverse direction and to the direction of the longitudinal axis of the telescope.

The two trunnion supports constrain the telescope from movement in two axes, and cooperate to constrain the telescope from rotation about these axes by providing a mechanical force couple spaced apart by the transverse trunnion spacing. The two trunnion supports and the second keel support cooperate in a similar manner to constrain rotational movement about the transverse axis.

Longitudinal or bending deformation of the spacecraft is not transmitted to the telescope but is absorbed in slipping movements of the trunnions and keel supports, in non-load-carrying directions. Yet the structure provides a desirable six-degrees-of-freedom kinematic interface between the spacecraft and the telescope, and transmits inertial launch loads between the spacecraft and the telescope.

The specific locations of these support points are not critical to this invention and may be varied to optimize the stiffness and load distribution of the telescope and the spacecraft structure. However, the six-degrees-of-freedom restraint between the telescope and spacecraft structure, i.e. three orthogonal translations and three orthogonal rotations, must be maintained.

It will be appreciated from the foregoing that the present invention represents a significant advance in the field of spacecraft design. In particular, the invention provides a supporting structure that is sufficiently constraining to transmit inertial launch and maneuvering loads as desired, but is operative to effectively decouple deformation forces during launch or in orbit, such that the telescope payload is virtually isolated from deformations of the supporting spacecraft. Other aspects and advantages of the invention will become apparent from the following more detailed description, taken in conjunction with the accompanying drawings.

DESCRIPTION OF THE PREFERRED EMBODIMENT

Figure 1:
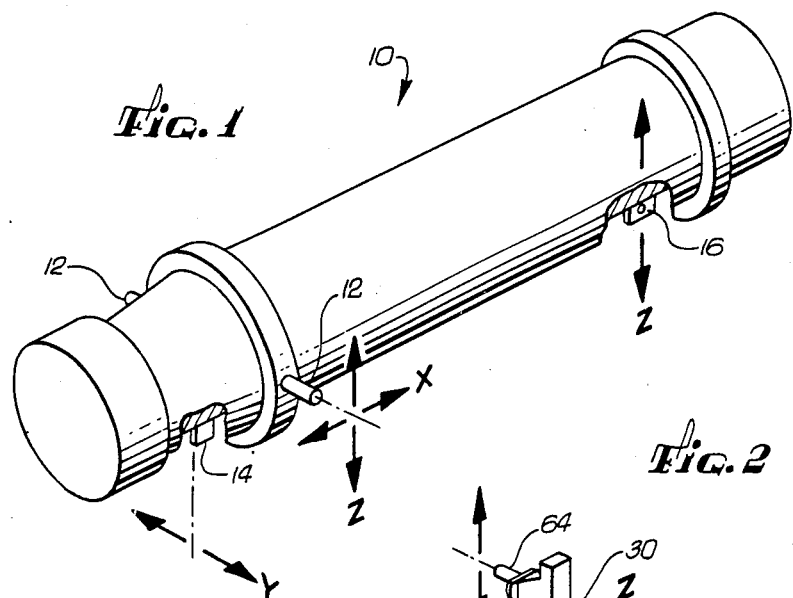
FIG. 1 is simplified perspective view of a space-based telescope, showing its mounting hardware.

As shown in the drawings for purposes of illustration, the present invention is concerned with a structure for supporting a sensitive payload, such as a telescope or other optical bench, on a spacecraft. The principal difficulty encountered in supporting the telescope is to provide sufficient support to transmit acceleration loads, but to isolate the telescope from deformations of the spacecraft, whether caused by differential thermal effects or other causes.

As shown in FIG. 1, in accordance with the invention a telescope, indicated by reference numeral 10, is supported at four points, the first two being at two trunnion supports 12 located near one end of the telescope. For purposes of reference, this end of the telescope 10 is referred to as the forward end, only because in the illustrated embodiment, it is the end pointed toward a selected star or other body. The terms "forward" and "aft" are, however, arbitrary, and do not necessarily relate to a preferred direction of motion. The other two points of support are at a first keel support 14 and a second keel support 16. In the embodiment of the invention as illustrated, the first keel support 14 is located between the two trunnion supports 12, and the second keel support 16 is located near the opposite end of the telescope 10. It will be understood, however, that the relative locations of the supports may be varied to optimize the stiffness and load distribution of the telescope 10 and the supporting spacecraft structure now to be described.

Figure 2:
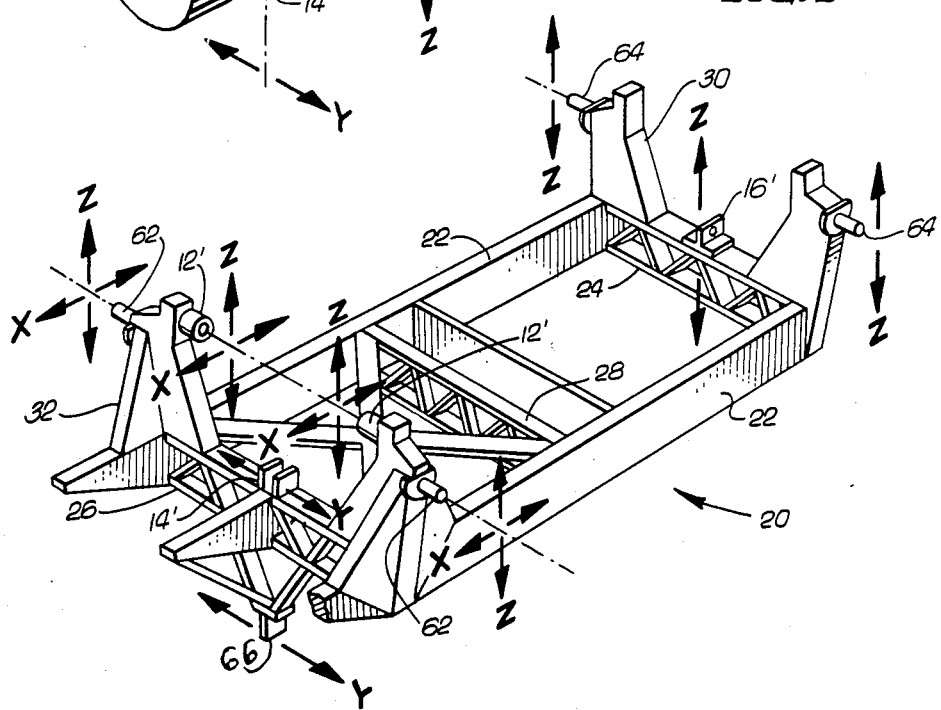
FIG. 2 is a corresponding perspective view of a spacecraft structure on which the telescope of FIG. 1 is to mounted.
Figure 3A:
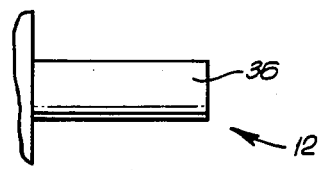
FIGS. 3a and 3b are elevational views of a trunnion support fitting used in mounting the telescope to the spacecraft.
Figure 3B:
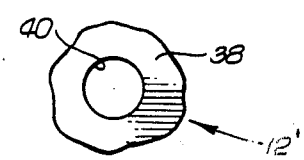

The spacecraft, indicated generally by reference numeral 20 in FIG. 2, is formed from a number of box beams of aluminum or similar material, bolted together to form a rigid platform for attaching supporting structure and equipment. The details of the spacecraft structure are not critical to the invention. It suffices to say that the spacecraft as illustrated comprises two parallel longitudinal beams 22, joined by an aft transverse web structure 24, a forward transverse web structure 26, and a central or intermediate transverse web structure 28. Other bracing members may be included in specific configurations. Rigidly connected with this generally rectangular platform are an aft cradle structure 30 and a forward cradle structure 32. The cradles structures 30 and 32 are basically contoured corner-posts on the rectangular platform formed by the longitudinal beams 22 and the aft and forward transverse web structures 24 and 26.

For convenience, the following convention is employed in referring to three-dimensional space. The fore-to-aft direction, parallel with the longitudinal beams 22, is referred to as the x direction or axis. The transverse direction, parallel with the transverse web structures 24, 26, and 28, if referred to as the y direction or axis. Finally, the direction orthogonal to the x and y directions is referred to as the z direction or axis.

The trunnion supports 12 on the telescope 10 have counterparts 12' on the spacecraft 20, positioned as inwardly facing elements on the forward cradle structure 32. The forward keel support 14 on the telescope 10 has its counterpart 14' on the spacecraft 20, positioned midway between the trunnion supports 12' and on the forward web structure 26. Finally, the aft keel support 16 has its counterpart 16' located midway along the aft web structure 24.

A critical aspect of the invention is the selection of support types for the trunnion supports 12 and keel supports 14 and 16. In particular, the trunnion supports 12, 12' are selected to react to loads only in the x and z directions, as indicated by the arrows labeled x and z adjacent to the trunnion supports. Loads in the y direction, transversely across the spacecraft structure, are not transmitted between opposite members 12, 12' of the trunnion supports. The forward keel support 14 reacts only forces in the y direction, as indicated by the arrow labeled y adjacent to the forward keel support 14. The aft keel support 16 reacts only z-direction loads, and permits a least limited movement in the x and y directions. Each support is constructed to eliminate any capability to transmit a local turning moment or torque.

It will be seen that this arrangement provides a support structure limiting all six degrees of freedom of the telescope, and allows the transmission of acceleration forces in a predictable manner. However, various deformations of the spacecraft 20 will not be transmitted to the telescope. For example, if the spacecraft 20 is elongated by thermal expansion, this will not be transmitted through the support structure, since the aft keel support 16 provides for slip in the x direction. Similarly, if the spacecraft 20 is bowed in the x-y plane, this deformation will be decoupled from the telescope 10 by slippage of the aft keel support 16 and trunnion supports 12 in the y direction. Slippage of the forward keel 14 in the x direction allows limited pivoting of the telescope about the trunnion supports 12, and decouples any bowing deformation of the spacecraft in the x-z plane. In short, the combination of the trunnion supports 12, and the keel supports 14 and 16, provides sufficient support for transmission of accelerating loads during launch and maneuvering, but decouples deformation forces occurring during launch or in operational orbit.

Some exemplary support structures are shown in more detail in FIGS. 3–7. As shown in FIGS. 3a and 3b, each of the trunnion supports 12 includes a pin 36 and each of the corresponding supports 12' includes a plate 38 (FIG. 3b) having a hole 40 formed in it and sized to receive the pin in a sliding fit. The pin 36 is aligned with the y axis, allowing slip in this direction, but providing rigid support in the x and z directions.

Figure 6:
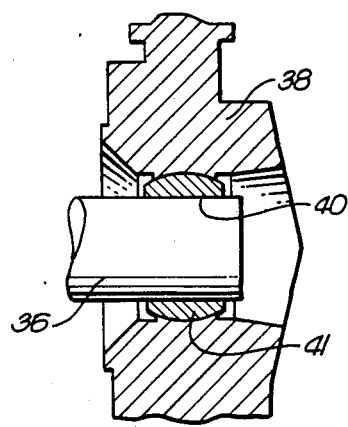
FIG. 6 is a more detailed cross-sectional view of one form of a suitable trunnion support.

FIG. 6 shows a slightly different arrangement, in which the pin 36 is fitted in a spherical bearing 41, which is fitted in a part spherical bearing surface in the plate 38. The spherical bearing 41 permits limited rotation of the pin about the x and z axes, as well as rotation about the transverse y axis, but still constrains translational movement in the x-z plane.

Figure 4A:
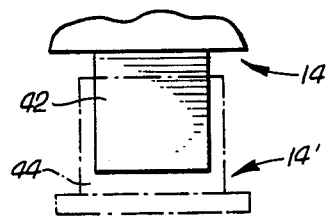
FIGS. 4a and 4b are elevational views of a first keel support fitting used in the same mounting structure.
Figure 4B:
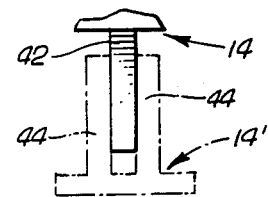
Figure 5A:
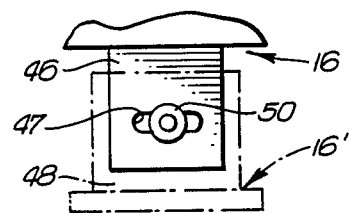
FIGS. 5a and 5b are elevational views of a second keel support fitting used in the same mounting structure.
Figure 5B:
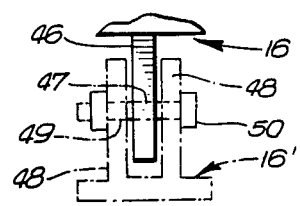

The forward keel fitting 14, 14' is shown in FIGS. 4a and 4b as comprising a plate 42 aligned in the x-z plane. The corresponding fitting 14' includes a pair of plates 44 spaced apart sufficiently to receive the plate 42 in a sliding relationship allowing practically no movement in the y direction.

The aft keel support 16 also includes a plate 46 attached to the telescope, aligned in the x-z plane and having an elongated hole or slot 47 through it, the slot being elongated in the x direction. The corresponding fitting 16' (FIG. 5b) includes a pair of parallel spaced-apart plates 48, but in this case spaced apart to provide a loose fit with the plate 46. There are aligned holes 49 through the parallel plates 48, and a pin 50 passing through the slot 47 and the holes 49 secures the fitting against movement in the z direction only. Limited slip in the y direction is permitted by the loose fit between the parallel plates 48, and slip in the x direction is permitted by means of the slot 47 in the plate 46.

Figure 7:
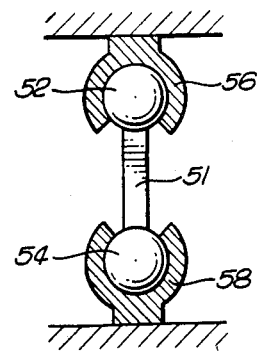
FIG. 7 is a diagrammatical view of another form of keel support suitable for either or both of the keel supports of FIG. 1.

Another form of the keel supports 14 and 16 is shown in FIG. 7. Each keel support of this type includes a rigid link 50 having spherical end portions 52 and 54. Each of the spherical end portions 52 and 54 is journaled in a spherical bearing, indicated at 56 and 58, respectively. The support structure shown will transmit loads only along the axis of the link 50, and will permit limited translation in the other axes, or rotation about any axis. The link structure of FIG. 7 may be oriented to function as either the forward keel support 14 or the aft keel support 16. It will be appreciated that other detailed structures of different design could be employed as keel supports having the requisite load carrying and load relief functions. Various combinations are possible, using spherical or cylindrical bearings for local turning moment relief, linear bearings for axial slippage, and rigid or other linkages for load carrying.

The spacecraft 20 is supportable in the cargo bay of a space shuttle vehicle by means of five attachment points. The forward cradle structure 32 has two trunnion supports 62 located in an outwardly facing relationship, and providing support in the x and z directions only. The aft cradle structure 30 also has two trunnion supports 64, providing support in the z direction only. The fifth support point is a forward keel support 66 located beneath the forward transverse web structure 26. The combination provides a five-point, seven-degrees-of-freedom support for the spacecraft 20 when secured in the shuttle.

In the illustrative embodiment, the spacecraft 20 is designed to be secured in the cargo bay of a space shuttle, with the "forward" end of the spacecraft 20 facing aft in the shuttle. The support between the spacecraft structure 20 and the shuttle orbiter at the forward and aft trunnions 62 and 64 and keel fitting 66 is over-constrained in order to adequately distribute spacecraft loads to the available orbiter support locations. This over-constraint allows orbiter twist distortions to be transmitted to the spacecraft structure during launch. Although the spacecraft can tolerate these distortions during launch, the telescope is much more sensitive to distortions and is isolated or decoupled from these distortions as described above.

It will be appreciated from the foregoing that the present invention represents a significant advance in the field of spacecraft structures intended to support space telescopes or other optical benches with similar sensitivity. In particular, the invention provides a support structure that transmits acceleration loads in a predictable manner during launch and maneuvering, but isolates the telescope from various deformations of the spacecraft caused by thermal gradients or other factors. It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. A spacecraft suitable for supporting as a payload any of a variety of optical benches, the spacecraft having a longitudinal axis referred to as the x axis, a transverse axis referred to as the y axis, and a z axis orthogonal to the x and y axes, the spacecraft comprising:
    a rigid platform having two upstanding posts between which the payload is to be supported;
    a pair of trunnion supports mounted on the posts and providing coupling to the payload, to react to loads in x and z axes only; and
    a pair of keel supports mounted on the platform, and spaced apart along the x axis, to provide reaction to loads only in the y and z axes, respectively;
    whereby any deformtions to the spacecraft are not transferred to the payload, which is still supported by constraints in six degrees of freedom, and spacecraft subsystems are mountable on the spacecraft and not the payload.

2. A mounting structure for supporting a payload such as a telescope on a spacecraft, the mounting structure comprising:
    a pair of trunnion supports, each support being operative to provide reaction to loads in two orthogonal directions, but not in a direction parallel to the transverse direction between the two supports;
    a first keel support to provide reaction only to loads in the transverse direction; and
    a second keel support displaced from the first keel support, to provide reaction to loads only in a direction orthogonal to the transverse direction and to the direction of the longitudinal axis of the telescope;
    whereby deformations of the spacecraft are not transmitted to the telescope but are absorbed in slipping movements of the trunnion supports and the first or second keel supports.

3. A mounting structure as set forth in claim 2, wherein:

the first keel support is located between the trunnion supports.

4. A mounting structure as set forth in claim 2, wherein:

the trunnion supports and one of the first and second keel supports are located near one end of the telescope, and the other keel support is located near the other end of the telescope.

5. A mounting structure as set forth in claim 3, wherein:

the trunnion supports and the first keel support are located near one end of the telescope, and the second keel support is located near the other end of the telescope.

6. A mounting structure as set forth in claim 2, wherein the trunnion supports each include:

a pin affixed to one element of the support; and
a hole in the other element, the pin being sized for a sliding fit in the hole, and aligned in the transverse direction.

7. A mounting structure as set forth in claim 6, wherein:

each trunnion support also includes a spherical bearing in which the hole is formed, to permit relative rotation about any axis but to provide reaction to loads in the two axes orthogonal to the transverse direction.

8. A mounting structure as set forth in claim 2, wherein:

the first keel support includes two elements, one being a supported element and the other being a supporting element;
one element of the support includes a first plate aligned to a plane perpendicular to the transverse direction; and
the other element of the support includes a pair of plates parallel to the first plate, and spaced to receive the first plate in a sliding fit to allow movement parallel to the plane but not in the transverse direction.

9. A mounting structure as set forth in claim 2, wherein each of the keel supports comprises:

a rigid link;
a first spherical bearing coupling one end of the link to the spacecraft; and
a second spherical bearing coupling the other end of the link to the telescope;
whereby the support provides reaction to loads along a selected axis, through the link, but permits relative movement in the other axes and relative rotation about any axis.

10. A mounting structure as set forth in claim 2, wherein:

the second keel support includes first and second elements, one being a supported element and one being a supporting element;
one of the first and second elements includes a first plate having an elongated slot therethrough and aligned in a plane perpendicular to the transverse direction;
the other of the first and second support elements includes a pair of plates parallel with the first plate, and spaced apart to receive the first plate in a loose fit with substantial clearance, each of the pair of plates having a hole therethrough; and the second keel support also includes a pin extending through the holes and the slot, to provide resistance to loads in one direction, perpendicular to the elongated slot, but permitting limited slip in the other directions.

11. A mounting structure for supporting a payload such as a telescope, the mounting structure having a longitudinal axis referred to as the x axis, a transverse axis referred to as the y axis, and a z axis orthogonal to the x and y axes, and the mounting structure comprising:

two trunnion supports positioned on a common y axis on opposite sides of the telescope, to provide reaction to loads in the x and z directions only;
a first keel support to provide reaction to loads in the y direction only; and
a second keel support, displaced in the x direction from the first keel support, to provide reaction to loads in the z direction only;
whereby the arrangement of supports transmits acceleration forces from the spacecraft structure to the telescope, but isolates the telescope from deformations of the spacecraft structure.

12. A mounting structure as set forth in claim 11, wherein:

the trunnion supports and one of the first and second keel supports are located near one end of the telescope, and the other keel support is located near the other end of the telescope.

13. A mounting structure as set forth in claim 11, wherein:

the trunnion supports and the first keel support are located near one end of the telescope, and the second keel support is located near the other end of the telescope.

14. A mounting structure as set forth in claim 11, wherein the trunnion supports each include:

a pin affixed to one element of the support; and
a hole in the other element, the pin being sized for a sliding fit in the hole, and aligned in the y direction.

15. A mounting structure as set forth in claim 14, wherein:

each trunnion support also includes a spherical bearing in which the hole is formed, to permit relative rotation about any axis, but to provide reaction to loads in the x and z directions.

16. A mounting structure as set forth in claim 11, wherein:

the first keel support includes two elements, one being a supported element and the other being a supporting element;
one element of the support includes a first plate aligned in the x-z plane; and
the other element of the support includes a pair of parallel plates aligned in the x-z plane, and spaced to receive the first plate in a sliding fit to allow movement in the x-z plane but not in the y direction.

17. A mounting structure as set forth in claim 11, wherein each of the keel supports comprises:

a rigid link;
a first spherical bearing coupling one end of the link to the spacecraft; and
a second spherical bearing coupling the other end of the link to the telescope;
whereby the support provides reaction to loads along a selected axis, through the link, but permits relative movement in the other axes and relative rotation about any axis.

18. A mounting structure as set forth in claim 11, wherein:
 the second keel support includes first and second elements, one being a supported element and the other being a supporting element;
 one of the first and second elements includes a first plate having an elongated slot therethrough and aligned in the x-z plane;
 the other of the first and second elements includes a pair of plates parallel with the first plate, and spaced apart to receive the first plate in a loose fit with substantial clearance, each of the pair of plates having a hole therethrough; and
 the second keel support also includes a pin extending through the holes and the slot, to provide resistance to loads in the z direction, but permitting limited slip in the x and y directions.

* * * * *